Patented Oct. 23, 1951

2,572,566

UNITED STATES PATENT OFFICE 2,572,566

PROCESS FOR PRODUCTION OF 3,4-DIHYDROXYTETRAHYDROFURAN

Chester M. Himel and Lee O. Edmonds, Bartlesville, Okla., assignors to Phillips Petroleum Company, a corporation of Delaware No Drawing. Application January 7, 1949, Serial No. 69,818

1 Claim. (Cl. 260—345)

This invention relates to the production of a 3,4-dihydroxytetrahydrofuran. In one of its aspects the invention relates to the dehydration and concomitant cyclization of an erythritol to a 3,4-dihydroxytetrahydrofuran. In another of its aspects the invention relates to the production of a 3,4-dihydroxytetrahydrofuran by a catalytic process. In still another aspect the invention relates to the dehydration and concomitant cyclization of an erythritol employing certain catalysts not heretofore applied for this purpose. In one of its embodiments the invention provides a cyclization process for the catalytic dehydration of an erythritol to a 3,4-dihydroxytetrahydrofuran employing certain carefully selected and controlled conditions of operation in the presence of a catalyst not heretofore applied for this purpose.

The reaction of the present invention can be illustrated by the following equation

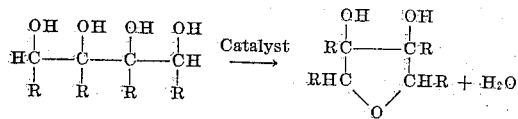

wherein R can be selected from the group consisting of hydrogen, an alkyl radical containing not more than three carbon atoms and a phenyl radical and wherein the total number of carbon atoms does not exceed ten. Other substituents may be present provided these are not reactive during the dehydration process.

3,4-dihydroxytetrahydrofuran is a compound characterized by stability and is of considerable present interest as an intermediate for the production of valuable organic derivatives. In plentiful supply it would have many potential uses as a plasticizer, glyptal resin intermediate, a solvent having the combined properties of glycol, hydrofuran and cyclic glycol ether. The production of 3,4-dihydroxytetrahydrofuran is at present limited because there has been available no suitable process for its economical large scale production. Thus, a prior art disclosure of a method for the production of 3,4-dihydroxytetrahydrofuran consists of refluxing erythritol with 50% sulfuric acid, phosphoric acid or formic acid for twelve hours. This process involves extensive degradation of both the starting material and the product and this results in a very poor efficiency and a correspondingly low yield. Furthermore, large quantities of tars and other degradation products contaminate the reaction mixture. These contaminants make the separation of the desired product difficult and uneconomical. Also the product must be separated from the large quantity of water which is present.

Thus, at present considered to be of particular importance is the embodiment of the invention in which erythritol is dehydrated and cyclized to 3,4-dihydroxytetrahydrofuran. This reaction can be represented by the following equation

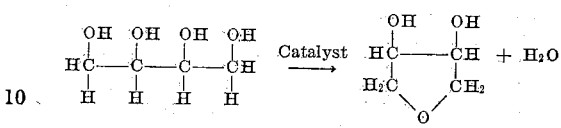

We have found that the dehydration and cyclization of erythritol to 3,4-dihydroxytetrahydrofuran can be accomplished readily in substantially theoretical yield without the formation of any appreciable degradation products, tars or other undesirable materials and without separation of the product from large quantities of water, or any difficult separation from the reaction mixture, by effecting the dehydration under substantially anhydrous conditions in the presence of a sulfonic acid under controlled and correlated conditions of temperature and time. No specialized equipment is required, a simple reaction vessel or reactor being suitable to effect the process of the invention.

Thus, according to this invention there is provided a process for the dehydration and concomitant cyclization of an erythritol which comprises subjecting the erythritol under dehydration conditions to the action of a sulfonic acid catalyst.

The following discussion, though it applies generally to the dehydration and cyclization of the erythritols of the general formula given above, is particularly applicable to erythritol, per se. For the optimum conditions applicable in each instance no more than mere routine test will be required by one skilled in the art.

The erythritol is preferably used in substantially pure and anhydrous condition. However, it can also be used in the presence of some water. The presence of water is not preferred because it makes temperature and pressure control difficult.

The sulfonic acids which can be employed as catalyst for the reaction of this invention include the mild hydrocarbon sulfonic acids such as benzenesulfonic acid, toluenesulfonic acid, xylenesulfonic acids, ethanesulfonic acid and the like. A characteristic of the acids suitable for the practice of the invention is that these shall be mild or non-carbonizing. The alkyl-, aralkyl-, alkaryl-, and arylsulfonic acids, which have not more than about twenty carbon atoms in the molecule, possess these characteristics and are now preferred.

The quantity of acid catalyst employed will be usually from about 0.1% to about 5%, preferably from about 1% to about 3% by weight of the erythritol.

Time and temperature appear to be critically interdependent in the process of the invention. We have found that optimum yields are obtained when operating at an elevated temperature and a short contact time. Thus, at temperatures in the approximate range of 85° C.–200° C. the time for highest yield will be in the approximate range of from about one minute to about one and one half hours. Preferably the temperature will be in the range of from about 140° C. to about 180° C. and the contact time will be of the order of not more than about fifteen minutes. The exact time period for any temperature can be determined by mere routine test.

The pressure in the reaction system should be, preferably, in the range of from about 0.1 to about 20 millimeters mercury absolute, more preferably in the range 0.5 to about 10 millimeters.

A preferred embodiment of our process comprises charging erythritol and catalyst to a reactor, fitted with a suitable condenser designed for vacuum operation, reducing the pressure to about one millimeter and elevating the temperature to about 160° C. Under these conditions the reaction proceeds rapidly, the erythran being distilled as formed.

Among suitable salts and bases to deactivate or neutralize the catalyst prior to the distillation of the product, in a batch operation, are included soluble basically reacting materials such as alkali metal hydroxide, alkali metal bicarbonates, carbonates and soluble salts of a volatile acid and a relatively strong base such as ferric chloride, zinc chloride, sodium chloride, sodium acetate and the like. It is to be noted that to be effective to deactivate the catalyst the neutralizing agent must be soluble and should cause liberation of a volatile acid which is easily removed from the reaction zone.

Although this invention has been described as a batch process, it is adaptable to continuous operation and such operation is considered to be within the scope of this disclosure and the claim as being within the skill of those versed in the art after a reading hereof. When operating in a continuous manner, temperatures up to about 200° C., may be employed. By so operating, the product is allowed only very short time of contact with the catalytic substance and degradation of the product is avoided. In such cases, neutralization may be dispensed with and the catalyst may be used over long periods. After extended operation it may be necessary to add small amounts of catalyst to replenish the initial charge.

*Example I*

A series of seven runs was made in each of which 61 grams (0.5 mol) of meso-erythritol and one gram of toluene sulfonic acid catalyst were charged to reactors fitted for vacuum operation. The reactions were carried out at a pressure of approximately one millimeter mercury. In the first five, the condensers were arranged to operate under total reflux and the reactions were halted at a predetermined time by addition of two grams of zinc chloride to deactivate the catalyst. The last two reactions were carried out with the condensers arranged for removal of the product as formed, thus limiting the reaction time to the shortest possible period, which for the final portion was between 10 and 15 minutes. Results of these runs are tabulated below:

| Run | Temp., °C. | Contact Time (min.) | Conversion (Per Cent) | Yield (Per Cent) (Redistilled)[1] |
|---|---|---|---|---|
| 1 | 120 | 30 | 31 | 51 |
| 2 | 120 | 60 | 37 | 37 |
| 3 | 140 | 15 | 42 | 81.5 |
| 4 | 140 | 30 | 44 | 78 |
| 5 | 150 | 15 | 48 | 80 |
| 6 | 150 | [2] | 100 | 87 |
| 7 | 170 | [2] | 100 | 87 |

[1] B. P. 105° C./0.5 mm. Hg; $n_D^{20}$ 1.4800 (meso erythran).
[2] Product distilled as formed, 0.2 gram kettle residue, total reaction time 10–15 minutes.

*Example II*

A run was made using 61 parts by weight of meso-erythritol and 1 part of xylene sulfonic acid as catalyst. The system was heated at 130°–150° C. under reduced pressure and the product distilled as formed. A yield of 46 grams (89 per cent) of crude 3,4-dihydroxytetrahydrofuran was obtained.

*Example III*

A run was made using 61 parts by weight of dl erythritol and 1 part of toluene sulfonic acid as the catalyst. The mixture was heated at 170° C. under reduced pressure, the erythran being distilled as formed. A yield of 88 per cent of crude product was obtained, which upon redistillation provided 33 grams (64 per cent) of purified dl 3,4-dihydroxytetrahydrofuran boiling at 118° C. at 0.5 mm. mercury pressure and having an index of refraction of 1.4795.

Reasonable variation and modification are possible within the scope of the appended claim to the invention, the essence of which is that a readily effected, highly efficient and novel process has been set forth for the preparation of a 3,4-dihydroxytetrahydrofuran by dehydration and cyclization of an erythritol in the presence of a mild noncarbonizing sulfonic acid.

We claim:

The preparation of 3,4-dihydroxytetrahydrofuran which comprises heating an erythritol at a temperature in the approximate range 85°–200° C. in the presence of a mild, non-carbonizing hydrocarbon sulfonic acid selected from the group consisting of benzenesulfonic acid, toluenesulfonic acid, xylenesulfonic acid and ethanesulfonic acid under dehydrating conditions for a time in the approximate range of one minute to one and one-half hours, the temperatures in the upper end of the temperature range being employed together with periods of time selected from the lower end of the time range and vice versa.

CHESTER M. HIMEL.
LEE O. EDMONDS.

REFERENCES CITED

The following references are of record in the file of this patent:

UNITED STATES PATENTS

| Number | Name | Date |
|---|---|---|
| 2,251,895 | Reppe | Aug. 5, 1941 |
| 2,375,915 | Grandel | May 15, 1945 |
| 2,390,395 | Soltzberg | Dec. 4, 1945 |

OTHER REFERENCES

Beilstein—vol. 17, p. 153.
Pigman et al.: "Chemistry of the Carbohydrates"; p. 351, Academic Press Inc., New York, April 1948.